United States Patent [19]

Stevenson

[11] 4,048,257
[45] Sept. 13, 1977

[54] PIGMENTABLE LOW SHRINK THERMOSETTING POLYESTERS

[75] Inventor: Donald R. Stevenson, Dover, Ohio

[73] Assignee: SCM Corporation, New York, N.Y.

[21] Appl. No.: 630,757

[22] Filed: Nov. 10, 1975

Related U.S. Application Data

[63] Continuation-in-part of Ser. No. 520,455, Nov. 4, 1974, abandoned, and a continuation-in-part of Ser. No. 516,446, Oct. 21, 1974, abandoned, and a continuation-in-part of Ser. No. 514,372, Oct. 15, 1974, abandoned.

[51] Int. Cl.$^2$ ............................................. C08L 67/06
[52] U.S. Cl. ................................ 260/862; 260/40 R; 260/861; 260/873
[58] Field of Search ................. 260/40 R, 862, 873, 260/861

[56] References Cited

U.S. PATENT DOCUMENTS

| | | | |
|---|---|---|---|
| 2,694,700 | 11/1954 | Shanta | 260/901 |
| 3,081,278 | 3/1963 | Wohnsiedler | 260/873 |
| 3,267,176 | 8/1966 | Mahlman | 260/862 |
| 3,488,745 | 1/1970 | Wright | 260/93.5 |
| 3,668,278 | 6/1972 | Bonvicini et al. | 260/873 |
| 3,865,904 | 2/1975 | Wingler et al. | 260/901 |
| 3,883,612 | 5/1975 | Pratt et al. | 260/862 |

Primary Examiner—Carman J. Seccuro
Attorney, Agent, or Firm—Thomas M. Schmitz

[57] ABSTRACT

This invention pertains to a pigmentable, low-shrink molding composition based on thermosetting, unsaturated polyester resin in combination with lightly cross-linked polymer particles. The lightly cross-linked polymer particles have a particle size preferably between about 20 microns to 50 microns and can be selected from lightly cross-linked condensation polymers and lightly cross-linked addition polymers. In a preferred aspect of the invention the lightly cross-linked polymer particles contain minor amounts of pendant reactive groups selected from amino and oxirane groups to produce a one-pack stabilized low-shrink molding resin mixture. The pigmentable, low-shrink molding compositions are stabilized dispersions containing pigments dispersed therein in conjunction with thermosetting polyester polymer, monomer, and lightly cross-linked polymer particles as well as fillers to provide a pigmentable low-shrink molding composition which cures to uniformly pigmented low-profiled molded part.

10 Claims, No Drawings

PIGMENTABLE LOW SHRINK THERMOSETTING POLYESTERS

BACKGROUND OF THE INVENTION

This application is a continuation-in-part of my copending applications identified as Ser. No. 514,372 filed on Oct. 15, 1974; and Ser. No. 516,446 filed on Oct. 21, 1974; and Ser. No. 520,455 filed on Nov. 4, 1974; all now abandoned and said applications are specifically incorporated herein by reference.

Unsaturated polyester polymers blended with vinyl monomers such as styrene are well known molding resins that can be cured at room temperature or under heat and/or pressure to form a thermoset plastic molded part. These molding resins often include inert fillers, glass fibers, glass flakes, talcs, and the like for the purpose of obtaining improved impact strength, flexural strength, and rigidity in the molded parts. Most conventional thermosetting plastic resins, however, characteristically shrink about 8% to 10% by volume and distort during the molding process whereby the shrinkage of such conventional molding resins are unsatisfactory despite the many favorable inherent characteristics of polyester molding compositions. To offset the low-shrink characteristic, several low-shrink resin systems have been suggested and primarily include a thermosetting polyester resin, a thermoplastic resin, and a reactive unsaturated monomer mixed together with various filler materials. Conventional low-shrink resin systems are one-component and two-component systems. A particularly desirable low-shrink moulding composition is disclosed in U.S. Pat. No. 3,883,612, which provides a stabilized emulsion comprising a dicyclopentadiene modified polyester resin intermixed with a thermoplastic polymer having acid functionality to form a uniform emulsion mixture.

Although known resin systems produce desirable low-profile non-pigmented molded parts, such resin systems are difficult to pigment and tend to produce non-uniform pigmentation and inconsistent coloring such as streaking, mottling, and light color due to the molding characteristics of the resin system.

Accordingly, it now has been found that a substantially improved, pigmentable, low-shrink polyester resin system can be produced by providing a thermosetting molding resin system containing lightly cross-linked polymer particles.

SUMMARY OF THE INVENTION

In accordance with this invention, a pigmented one-component, low-shrink molding composition is provided comprising a stabilized dispersion mixture, an ethylenically unsaturated polyester polymer, a reactive vinyl monomer, and lightly cross-linked polymer particles. The lightly cross-linked polymer particles have a particle size between about 15 and 100 microns and a cross-linking density between about 0.005 to 2 equivalent cross-links per kilogram of polymer. A preferred aspect provides that the polymer particles contain by weight between about 0.02% to 5% amine (N) or between about 0.2% to 15% oxirane

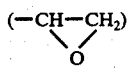

to produce a stabilized one-component system being a uniform stabilized dispersion which avoids layer separation upon standing over extended periods of time.

DETAILED DESCRIPTION OF THE INVENTION

Low-shrink molding resin systems of this invention comprise three major components, namely: lightly cross-linked, polymer particles; unsaturated polyester polymer; and a monomer (usually styrene). The low-shrink compositions contain fillers, thickeners and other additions in addition to pigments.

In accordance with this invention, the preformed polymer particles are lightly cross-linked reactive polymer particles having an average particle size of between about 15 to 100 microns and preferably 20 and 50 microns. The particle size of the lightly cross-linked reactive polymer particles appears to effectively control voids in the molded part wherein voids below about 20,000 A apparently cause undesirable light scattering and consequent mottling and streaking in the molded part. In addition to light scattering effects, preformed polymer particles below about 15 microns cause increased viscosity of the polyester resin molding composition whereas above about 100 microns causes undesirable surface porosity in the molded part. The lightly cross-linked polymer particles broadly have a cross-linked density of between about 0.005 to 2.0 and preferably between 0.01 to 1.0 depending on the polymer as will become more apparent hereinlater.

In accordance with one aspect of this invention, the preformed polymer particles can be lightly cross-linked linear polymers being ethylenically unsaturated monomers copolymerized by addition through the double bond and cross-linked by minor amounts of difunctional or multifunctional monomer. The average particle size of the lightly cross-linked polymer particles is at least about 15 microns and between about 15 to 100 microns and preferably between about 20 and 50 microns. The particle size of the lightly cross-linked polymer particles appears to effectively control voids in the molded part wherein voids below about 20,000 A apparently cause undesirable light scattering and consequent mottling and streaking in the molded part. The lightly cross-linked polymer particles have a cross-linking density between about 0.005 equivalent cross-linking sites per kilogram of polymer and up to about 2.0 equivalent cross-linking sites per kilogram of polymer. Greater cross-linking improves pigmentation but increases shrinkage. The preferred cross-linking range is between about 0.01 to 1.0 equivalent cross-linking sites per kilogram of polymer. Cross-linked density is determined by first calculating the equivalent cross-linking sites in a monomer having reactive functionality of at least two for cross-linking vinyl monomers. Divinyl benzene, for example, has an ethylenic unsaturation functionality of two and a cross-linking site of one since the other double bond is considered copolymerized in the polymer chain. For definitive purposes, the cross-link density of the polymer is the number of equivalent cross-linking sites in a gram mole of multifunctional monomer per kilogram of polymer. A polymer containing 10 grams of divinyl benzene copolymerized with 990 grams of monofunctional monomer (styrene), for example, has 10/130 cross-linking sites or a cross-linking density of 0.0769 equivalent cross-linking sites per kilogram of polymer. On a weight percentage basis, the polymer particles generally contain between 0.1% to 10% cross-linking monomers and higher depending on the molecular weight of the cross-linking monomer.

The lightly cross-linked polymer particles are produced by addition polymerization through the ethylenic unsaturation of monofunctional unsaturated monomers. The monofunctional monomeric components are one or more ethylenically unsaturated monomers and can include butadiene, styrene, vinyl acetate, vinyl toluene, vinyl chloride, chloryl styrene, hydroxy ethyl acrylate, acrylamide, acrylonitrile, and lower alkyl esters of acrylic and methacrylic acid having alkyl portions of 1–6 carbon atoms such as methyl methacrylate, methyl acrylate, ethyl acrylate, and polyether acrylate. Acid groups can be introduced into the polymer particles by the inclusion of unsaturated aliphatic carboxylic acids having sufficient double bond reactivity to react with other unsaturated monomers to provide a copolymer or lightly cross-linked polymer particles. Preferred unsaturated carboxylic acids are aliphatic, monocarboxylic or dicarboxylic acids having from 3–12 carbon atoms and include, for example, monocarboxylic acid such as acrylic, methacrylic, and cinnamic acids and further include dicarboxylic acids such as itaconic, maleic, and fumaric acids. The acid number of the lightly cross-linked polymer particles can be between about 0 to 40.

Suitable difunctional cross-linking vinyl monomers include, for example, diallyl phthalate, divinyl benzene, divinyl ether, neopently glycol diacrylate, diallyl phenyl phosphonate, dially isopropylidene, and 1.6 hexane diacrylate and similar diacrylates as well as other difunctional vinyl monomers having reactive difunctional ethylenic unsaturation capable of cross-linking other ethylenically unsaturated vinyl monomers. Cross-linking unsaturated monomers can further include for example a multifunctional ethylenically unsaturated polymer such as an ethylenically unsaturated polyester prepolymer which can effectively cross-link in styrene polymerizing to polystyrene. Triallyl cyanurate and other triacrylates are trifunctional monomers containing two cross-linking sites per mole of multifunctional monomer.

In accordance with a further aspect of this invention, the polymer particles can be essentially lightly cross-linked linear condensation polymers such as polyester polymers having minor amounts of ethylenically unsaturation which can be cross-linked by an ethylenically unsaturated vinyl monomer. The average particle size of the lightly cross-linked condensation polymer particles is between about 15 to 100 microns and preferably between about 20 and 50 microns which appears to effectively control voids in the molded part and avoid undesirable light scattering and consequent mottling and streaking in the molded part. The lightly cross-linked condensation polymer particles have a cross-linking density between about 0.0073 equivalent cross-linking sites per kilogram of polymer and up to about 1.2 equivalent cross-linking sites per kilogram of polymer. Greater cross-linking improves pigmentation but increases shrinkage. The preferred cross-linking range of the condensation polymer particles is between about 0.14 to 0.58 equivalent cross-linking sites per kilogram of polymer.

Cross-linking density of the condensation polymer particles is determined by first equating the available ethylenically unsaturated double bonds in the polymer such as a polyester backbone relative to the availability of ethylenically unsaturated double bonds in the cross-linking monomer wherein one equivalent double bond in the monomer cross-links one double bond in the polyester polymer backbone. The number of cross-linking sites in the finalized polyester particles is substantially limited to the lesser of equivalent double bonds occurring in the polyester polymer backbone or the equivalent double bonds in the cross-linking monomer. Thus a polyester polymer containing 0.3 equivalent double bonds available for cross-linking with 0.25 equivalent double bonds in the monomer produces a kilogram of lightly cross-linked polyester having a cross-linking density of 0.25 cross-linking sites per kilogram of polymer. Similarly a polyester polymer having 0.3 equivalent double bonds available for cross linking with 0.35 equivalent double bonds in the monomer produces a kilogram of lightly cross-linked polyester having a cross-linking density of 0.3 cross-linking sites per kilogram of polymer. Similarly excessive equivalent of styrene can be cross-linked with minor amounts of cross-linking unsaturated polyester polymer. Preferably, the equivalent unsaturation in the polyester polymer approximates the equivalent unsaturated double bonds in the monomer although considerable excess equivalent monomer unsaturation can be present to produce a linear polystyrene polymer cross-linked with unsaturated polyester polymer.

The lightly cross-linked condensation polymer particles are pseudo thermoplastic polymers including polyurethanes, polyamides, polyamines, epoxides, alkyd polyesters, polyethers, polycarbonates, and like condensation polymers, and preferably polyester polymers having a cross-linking a density between about 0.0073 gram equivalents to 1.2 equivalent cross-linking sites per kilogram of polymer. The lightly cross-linked polyester polymer particles are typically esterification products of polyols and dicarboxylic acids wherein the polyester polymer contains major amounts of saturated dicarboxylic acid and minor amounts of unsaturated dicarboxylic acids. Saturated dicarboxylic acid (or anhydride form) typically include, for example, adipic, isophthalic, orthophthalic, terephthalic, sebacic, sorbic and other similar dicarboxylic acids. In accordance with this invention, the lightly cross-linked polyester polymer contains minor amounts of alpha, beta-unsaturated dicarboxylic acid (or anhydride) and can include, for example, maleic, fumaric, mesaconic, itaconic, citraconic, dimeric methacrylic acid and other alpha beta-ethylenically unsaturated dicarboxylic acid. Typical glycols esterified with the dicarboxylic acids include, for example, ethylene glycol, propylene glycol, diethylene glycol, dipropylene glycol, butanediols and hexanediols. Minor amounts of higher polyols can be utilized such as pentaerythritol, triethylene glycol, trimethylol propane and glycerol as well as polyalkylene glycol ethers and hydroxy alkyl ethers.

The unsaturated dicarboxylic acids esterified in the polyester backbone are adapted to cross-link with ethylenically unsaturated vinyl monomer and include, for example, styrene, methyl styrene, chlorostyrene, vinyl toluene, divinyl benzene, vinyl acetate, acrylic and methacrylic acid and like unsaturated monomers.

The preformed lightly cross-linked polymer particles dispersed in the thermosetting resin solution apparently permit the preformed polymer particles to absorb monomer from the low-shrink resin system and yet prevent the lightly cross-linked polymer particles from becoming dissolved within the resin styrene monomer. The preformed lightly cross-linked polymer particles contain sufficient cross-linking to prevent solution thereof but not so highly cross-linked so as to completely resist swelling. Hence, the preformed, lightly cross-linked polymer particles are not thermoplastic but rather are pseudo thermoplastic and retain their shape upon being dispersed in polyester resin although swelling somewhat. The preformed lightly cross-linked polymer particles tend to swell and thereby acquire a solution density approximately the solution density of the thermosetting polyester resin (polymer and monomer). Accordingly, the dry preformed lightly cross-linked polymer particles have a specific gravity between about 1.10 to 1.50 and preferably between about 1.25 to 1.35 although the solution density of the particles diminishes somewhat by absorption of monomer when dispersed within the polyester resin. The swollen polymer particles increase in volume but do not solvate in monomers such as styrene wherein the polymers particles will swell in volume from 1 cm. to 6 cm. in height when submerged in styrene within a test tube.

Still a further improvement can be realized by providing the preformed lightly cross-linked polymer particles with minor amounts of reactive amino or oxirane groups. The reactive amino or oxirane groups on the lightly cross-linked preformed polymer particles are grafted onto the polymer particle by in situ reaction by providing ethylenically unsaturated double bonds in the polymer chain and thereafter reacting therewith an ethylenically unsaturated monomer containing oxirane groups or an ethylenically unsaturated monomer containing primary, secondary, or ternary amino groups. The amino or oxirane group containing monomer is copolymerized by addition through the ethylenic unsaturation in the polymer chain to provide reactive amino or oxirane groups on the surface of the polymer particles. For example, about 5% t-butylamino ethylmethacrylate; or 15% N,N'-dimethylaminoethylacrylate; or 1% neopentyl glycol diacrylate; or about 10% glycidal acrylate can be copolymerized with methylmethacrylate through suspension polymerization to provide preformed polymer particles having an average particle size between about 15 microns to 100 microns. Heating the reactive polymer particles in the low-shrink resin system at about 90° C for about one hour effectively corects the dispersed polymer particles with free carboxylic groups attached to the thermosetting unsaturated polyester polymer as will become more apparent hereinafter.

Suitable amino containing ethylenically unsaturated monomers that can be copolymerized with ethylenically unsaturated polymers include, for example: 2-aminoethyl methacrylate; m-amino styrene; t-butylaminoethylacrylate; t-butylaminomethacrylate; N,N-diethylaminoethylacrylate; N,N-diethylaminoethyl methacrylate; allyl amines; and divinyl amines. Preferably, amino polymer particles contain between about 0.02% to 5% nitrogen (N) by weight. Suitable oxirane containing ethylenically unsaturated monomers containing oxirane groups that can be copolymerized with ethylenically unsaturated polymers include for example: glycidyl methacrylate; allyl glycidal ether; and glycidyl acrylate. Preferred oxirane containing lightly cross-linked polymer contain by weight between about 0.2% to 15% reactive pendant oxirane

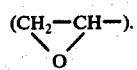

The preformed, lightly cross-linked polymer particles being addition polymers or condensation polymers in accordance with this invention or having reactive amino or oxirane groups in accordance with preferred aspects of this invention can be bead polymers produced by suspension polymerization wherein the polymerization catalyst is carried in the monomer phase. In suspension polymerization, droplets of monomer or mixtures of monomers containing polymerization initiator are produced by high speed agitation within a non-solvent (usually water) containing a hydrophobic surfactant. Each droplet is bulk polymerized and the exotherm therefrom is controlled by the surrounding nonsolvent water. A suspending agent prevents these droplets from coalescing into lumps and thereby regulates the particle size. The resulting particle size depends on the suspending agent and concentration thereof, the ratio of monomer to water, speed of agitation and like processing variables. A desirable suspending agent is 0.8% aqueous solution of hydroxyethylcellulose. Other suitable suspending agents include, for example, carboxymethylcellulose, polyacrylic acid, polyvinyl alcohol and others as indicated in the examples. Suspension polymerization is more particularly described in U.S. Pat. No. 2,694,700 and U.S. Pat. No. 3,488,745 and the same are included herein by reference. Average particle sizes of the preformed cross-linked polymer particle can be determined by optical microscope. The preformed lightly cross-linked polymer particles produced by suspension polymerization are thereafter precipitated out of solution, filtered, and dried prior to use in the low-shrink system. Although suspension polymerization is preferred, the lightly cross-linked polymer particles can be produced by grinding lightly cross-linked polymers hereinbefore described to obtain a particle size of about 15 to 100 microns.

Referring now to the ethylenically unsaturated thermosetting polyester polymer, the unsaturated polyester polymers are obtained by the polycondensation of an alpha, beta-unsaturated dicarboxylic acid with a polyol. Examples of alpha,beta-unsaturated dicarboxylic acids include: maleic, fumaric, mesaconic, itaconic, citraconic, dimeric methacrylic acid, and the like wherein dicarboxylic acids can be reacted in the anhydride form or ester form as opposed to the acid form. preferably, the thermosetting polyester contains only unsaturated dicarboxylic acids. but can further include lesser molar amounts of saturated dicarboxylic acids or their anhydrides up to about 20% molar replacement with saturated dicarboxylic acids. Examples of saturated dicarboxylic acids which can be used in such proportion include: adipic, isophthalic, orthophthalic, terephthalic, sebacic, succinic, and the like.

Polyols commonly used in forming thermosetting polyester polymers and conventionally esterified with dicarboxylic acids generally include glycols such as ethylene glycol, propylene glycol, diethylene glycol, dipropylene glycol, butanediol, hexanediol, but can include higher polyols such as pentaerythetrol, triethylene glycol, trimethylol propane, and glycerol. Also, polyalkylene glycol ethers and hydroxy alkyl ethers; e.g., 2,2-bis-(4-beta hydroxy alkoxy phenyl) alkanes and 2,2-bis-(hydroxy cyclohexyl) alkanes can be used, and for purposes herein, are referred to as "polyols." Preferably, dipropylene glycol and propylene glycol are included as the major component of the polyol and often constitute all of the polyol for making the preferred thermosetting polyester resin.

A particularly preferred polyester is a dicyclopentadiene modified polyester disclosed in commonly assigned U.S. Pat. No. 3,883,612 and the same is included herein by reference. The dicyclopentadiene-terminated unsaturated polyester polymer preferably comprises an ester copolymer of glycol, unsaturated dicarboxylic acid, and about 0.1–0.4 mols of dicyclopentadiene per mol of unsaturated dicarboxylic acid. The preferred thermosetting polyester is produced by the dicyclopentadiene being preferentially esterified with the unsaturated dicarboxylic acid to minimize etherification with hydroxyl groups. At temperatures of about 308° F, etherification of dicyclopentadiene with hydroxyl groups is a competing reaction to esterification of dicyclopentadiene with carboxyl groups. Hence, preferably only a portion of the glycol charge is reacted with a large molar excess of dicarboxylic unsaturated acid to first form primarily an acid terminated glycol-dibasic acid partial polymer. The acid terminated partial polymer is thereafter reacted with dicyclopentadiene to form a dicyclopentadiene-esterified polyester prepolymer. In practice, the preferred dicyclopentadiene-terminated polyester is prepared by first charging into the reactor 2 molar equivalents of dicarboxylic unsaturated acid per molar equivalent of glycol. The glycol and dicarboxylic mixture is then heated and reacted at esterification temperatures of about 290°–310° F until substantially all of the glycol is esterified by the excess molar equivalent of unsaturated dibasic acids. Completion of the glycol esterification can be measured by the acid number of the reactants becoming essentially constant, thus indicating no additional hydroxyl groups are available for esterification. Thereafter, dicyclopentadiene is added to the reactor and reacted with the glycol-dicarboxylic acid partial polymer at temperatures of less than 320° F, and preferably at a reaction temperature between about 290° to 310° F. After the dicyclopentadiene is completely charged to the reactor, the rectant mixture is maintained at about 308° F until the acid number of the reactants becomes essentially constant whereby the dicyclopentadiene is preferentially esterified with available terminal acid groups of the partial polymer. Thereafter, the remainder of the glycol charge can be added to the reactor whereupon the reaction is continued at temperatures of about 390° F to complete the formation of a dicyclopentadiene-terminated polyester polymer.

Ethylenically unsaturated monomers are vinyl monomers copolymerizable with unsaturated polyester polymers and are utilized to disperse or dissolve the unsaturated thermosetting polyester polymer of this invention and form an unsaturated polyester resin mixture. Vinyl monomers are well known and include, for example: styrene, methyl styrene, chlorostyrene, vinyl toluene, divinyl benzene, vinyl acetate, acrylic and methacrylic acid, lower alkyl esters of acrylic and methacrylic acid, vinylestes, vinylethers, vinylamides, diallyl phthalate and like unsaturated monomers of mixtures thereof. For reasons of efficiency and economy, the vinyl monomers most preferred in forming the low profile molding resin of this invention are styrene and vinyl toluene.

The foregoing stabilized resin emulsion desirably comprises a mixture of at least about 25 weight percent of the thermosetting polyester polymer, about 5 to 25 weight percent of lightly cross-linked polymer particles, and about 30 to 70 weight percent of styrene of other ethylenically unsaturated monomer. The preferred ranges are 8% to 20% cross-linked polymer particles, 40% to 55% monomer, and 35% to 45% unsaturated polyester polymer. The ratios of unsaturated, thermosetting polyester, monomer, and lightly cross-linked polymer particles can be varied within the scope of this invention to provide a one-component, uniform and stabilized dispersion system particularly suitable for pigmented low-shrink molded parts.

The low-shrink molding composition of this invention can be effectively pigmented by dispersing conventional pigment particles into the low-shrink resin composition by a Cowles mixer or similar high-speed mixer. Suitable opacifying pigments that can be utilized include, for example, titanium dioxide, lithopone, zinc sulfide, lead titanate, antimony oxide, zirconium oxide, titanium calcium, white lead, titaniunm barium zinc oxide, leaded zinc oxide. Tinctorial pigments can include, for example, ferrite yellow oxide, ferric oxide, brown iron oxide, tan iron oxide, raw sienna, burnt sienna, chromium oxide green, copper phthalonitrile blue, phthalocyanine green, ultramarine blue, carbon black, lampblack, toluidine red, parachlor red, cadmium reds and yellows, as well as organic pigments such as phthaloorganamine blue and greens.

The low-shrink molding resin composition of this invention is suitable for mixing with additives known as chemical thickeners which are physically mixed into the unsaturated thermosetting polyester polymers, ethylenically unsaturated monomer, and polymer particles. The chemical thickeners generally include Group 11 metal oxides, hydroxides, and alkoxides. The oxides and hydroxides of alkaline earths are preferred. For reasons of efficiency and economy, calcium oxide and magnesium oxide, or the respective hydroxides, are most often employed with low-shrink molding compositions.

Catalysts and promoters often are incorporated in small amounts into thermosetting polyester resins containing ethylenically unsaturated monomer for curing or cross-linking the unsaturated polyester with the monomer. Such catalysts and promoters are well known and may be similarly utilized in this invention for curing the thermosetting polyester polymer and monomer mixed with the lightly cross-linked polymer particles. Typical catalysts, for example, include organic peroxides and peracids such as tertiary butyl perbenzoate, tertiary butyl peroctoate, benzoyl peroxide, and the like. Examples of conventional promoters include cobalt octoate, cobalt naphthenate, and amines such as diethylaniline. The amounts of catalysts and promoters may be varied with the molding process and similarly varied with the level and types of inhibitors utilized, in a manner well known in the art. Fibers and fillers can be added in compounding a suitable molding composition and include for example gloss fibers, chopped fibers, chalk, kaolin, asbestos, calcium carbonate, talc, ceramic spheres quartz and the like.

The following examples illustrate the preferred embodiments of this invention but are not intended to limit the scope of this invention. Examples 1 to 9 inclusive pertain to addition polymers for the cross-linked polymer particles. Examples 11-13 illustrate condensation polymers, and Example 14-15 illustrate polymer particles having amino or oxirane groups.

EXAMPLE 1

Into a 3-liter-fluted resin kettle fitted with $N_2$ inlet, thermometer, paddle stirrer, and condenser was placed 1000 grams of a 0.8% aqueous solution of hydroxyethyl cellulose. After bubbling $N_2$ through the solution for 15 minutes, a solution comprising 198 grams of methyl methacrylate, 2 grams neopentylglycol diacrylate and 1.5 grams 2,2' azobisisobutyronitrile was added to the aqueous phase, vigorously agitated, and heated to 80° C. An exotherm occured after about 20 to 30 minutes and was controlled by adding cold water through the condenser. The rate of agitation was thereafter decreased and after about one hour at 80° C, the suspension was cooled. An excess of methanol was added to the suspension and this mixture was filtered, rinsed with methanol, and dried in a vacuum oven at 80° C. Yield was nearly quanitative. The average particle size was 70-100 microns and polymer particles had a cross-linking density of 0.0543 equivalent cross-linking sites per kilogram of polymer.

EXAMPLE 2 a. Several styrene and methyl methacrylate copolymers as indicated in Table 1 hereinafter were produced in accordance with the method in Example 1. The average particle size ranged from 20-100 microns. The cross-link density ranged from about 0.0054 to 1.15 equivalent cross-linking sites per kilogram of polymer. Preferred results were achieved with cross-linking density from 0.016 to 0.38 equivalent cross-linking sites per kilogram of polymer when compounded into a pigmented low-shrink polyester resin system.

b. A vinyl acetate polymer particle was produced in 3-liter fluted resin flask containing 100 grams of an 0.8% aqueous solution of hydroxyethyl cellulose. The solution was agitated vigorously upon adding a solution comprising 98 grams of vinyl acetate, 2 grams of triallylisocyanurate and 1 gram isopropyl peroxycarbonate. The temperature was increased to 50° C and held. After 30 minutes the reaction exothermed to about 65° C and was held at this temperature for 4 hours. The mixture was cooled and the suspension particles were allowed to settle. The water was decanted and the product was vacuum filtered and dried to give particle sizes from about 15 to 60 microns in size with an average particle size of between about 30–40 microns. Several vinyl acetate polymers indicated in Table 1 were produced in accordance with this procedure having an average particle size of about 20 to 50 microns. The cross-link density ranged from about 0.01 to 2.0 equivalent cross-linking sites per kiolgram of polymer. Preferred results were achieved with cross-linking density from 0.05 to 1.0 equivalent cross-linking sites per kilogram of polymer when compounded into a pigmented low-shrink polyester resin system.

TABLE 1

| | Suspension Polymers | | | Mole equiv. per kilogram of Polymer | Average Particle Size | Acid No. |
|---|---|---|---|---|---|---|
| a) | 99 | parts | methyl methacrylate | .0543 | 60-100 | 0 |
| | 1 | part | neopentyl glycol diacrylate | | | |
| b) | 99 | parts | styrene | .0543 | 80-100 | 0 |
| | 1 | part | neopentyl glycol diacrylate | | | |
| c) | 49.5 | parts | styrene | .0543 | 70-100 | 0 |
| | 49.5 | parts | methyl methacrylate | | | |
| | 1.0 | part | neopentyl glycol diacrylate | | | |
| d) | 48.5 | parts | styrene | .0543 | 60-70 | 7.56 |
| | 48.5 | parts | methyl methacrylate | | | |
| | 2.0 | parts | cinnamic acid | | | |
| | 1.0 | parts | neopentyl glycol diacrylate | | | |
| e) | 95.0 | parts | methyl methacrylate | .0543 | 50-60 | 17.00 |
| | 4.5 | parts | cinnamic acid | | | |
| | 0.5 | parts | neopentyl glycol diacrylate | | | |
| f) | 98 | parts | vinyl acetate | 0.1988 | 30-50 | 0 |
| | 2 | parts | trially isocyanurate | | | |
| g) | 97 | parts | vinyl acetate | 0.298 | 50-60 | 0 |
| | 3 | parts | trially isocyanurate | | | |
| h) | 95 | parts | vinyl acetate | 0.1988 | 80-100 | 0 |
| | 3 | parts | acrylic terminal polyester | | | |
| | 2 | parts | trially isocyanurate | | | |
| i) | 49.5 | parts | methyl methacrylate | .0543 | 60-80 | 0 |
| | 49.5 | parts | chloro styrene | | | |
| | 1.0 | part | neopentyl glycol diacrylate | | | |
| j) | 91 | parts | methyl methacrylate | .0543 | 50-70 | 0 |
| | 8 | parts | hydroxy ethyl acrylate | | | |
| | 1 | part | neopentyl glycol diacrylate | | | |
| k) | 91.6 | parts | methyl methacrylate | .0543 | 40-60 | 0 |
| | 7.4 | parts | acrylo nitrile | | | |
| | 1.0 | part | neopentyl glycol diacrylate | | | |
| l) | 97 | parts | methyl methacrylate | 0.1326 | 70-90 | 0 |
| | 3 | parts | 1,6 hexane diol diacrylate | | | |
| m) | 99.5 | parts | methyl methacrylate | 0.0221 | 70-90 | 0 |
| | 0.5 | part | 1,6 hexane diol diacrylate | | | |
| n) | 39 | parts | methyl methacrylate | .0543 | 40-60 | 0 |
| | 60 | parts | methyl acrylate | | | |
| | 1 | part | neopentyl glycol diacrylate | | | |
| o) | 60 | parts | methyl methacrylate | .0543 | 40-60 | 0 |
| | 39 | parts | methyl acrylate | | | |
| | 1 | part | neopentyl glycol diacrylate | | | |
| p) | 93 | parts | vinyl acetate | .519 | 80-100 | 17.9 |

TABLE 1-continued

| Suspension Polymers | | | Mole equiv. per kilogram of Polymer | Average Particle Size | Acid No. |
|---|---|---|---|---|---|
| q) | 5 parts<br>3 parts<br>51 parts<br>48 parts<br>1 part | allyl maleate<br>trially isocyanurate<br>methyl methacrylate<br>vinylidene chloride<br>neopentyl glycol diacrylate | .0543 | 80–100 | 0 |
| r) | 94 parts<br>5 parts<br>1 part | styrene<br>cinnamic acid<br>divinylbenzene | .0769 | 30–50 | 18.9 |
| s) | 96 parts<br>4 parts | methyl methacrylate<br>neopentyl glycol diacrylate | .2172 | 50–70 | 0 |
| t) | 96 parts<br>3 parts<br>1 part | vinyl acetate<br>allyl maleate<br>trially isocyanurate | .2917 | 70–90 | 10.76 |
| u) | 95.5 parts<br>2.5 parts<br>2.0 parts | vinyl acetate<br>allyl maleate<br>trially isocyanurate | .3591 | 30–40 | 8.97 |
| v) | 66.0 parts<br>30.0 parts<br>1.5 parts<br>2.0 parts<br>0.5 part | vinyl acetate<br>methyl methacrylate<br>acrylic acid<br>trially isocyanurate<br>neopentyl glycol diacrylate | .2359 | 90–110 | 11.66 |

EXAMPLE 3

A dicyclopentadiene-modified polyester polymer was synthesized from the following raw materials:
  9.9 gram moles of propylene glycol (752 grams)
  2.0 gram moles of dicyclopentadiene (264 grams)
  10.0 gram moles of maleic anhydride (980 grams).

Polymer synthesis was carried out in an ordinary reaction vessel suitable for batch processing of polyesters and including an agitator, heating means, condenser, and inert gas flow.

FIRST STEP: Formation of an acid terminated partial copolymer of propylene glycol-maleic ester was made by charging anhydride together with 3% xylene (based on the charge) into the reaction vessel and by heating under inert gas to 300° F for holding at 300° F for about 30 minutes until the acid number of the batch became constant. The acid number became constant at about 412 whereupon the second step commenced.

SECOND STEP: A prepolymer was prepared by adding the 2.0 moles of the dicyclopentadiene to the propylene-maleic partial copolymer at a reaction temperature of 308° F. The 2.0 moles of dicyclopentadiene were mixed with 3% xylene and added to the reaction vessel at a steady and continuous rate for a time period of 30 minutes and the reaction then continued until the acid number of the batch leveled off at about 276.

THIRD STEP: A dicyclopentadiene-terminated polyester was prepared by charging the remaining 4.9 moles of propylene glycol to the foregoing prepolymer in the reaction vessel, together with 0.3 grams of hydroquinone. The batch temperature was gradually increased to about 390° F and further processed until an acid number 30 was reached. A test sample of 7 parts resin mixed with 3 parts styrene yielded a viscosity of 3,600 cps. at 77° F, 0.5 grams of hydroquinone was added to the polymer which was then diluted with styrene to yield a dicyclopentadiene polyester resin containing a ratio of 70 weight parts of dicyclopentadiene polyester polymer and 30 weight parts of styrene monomer. Thereafter, about 1 gram ionol was added and the resin was discharged to a holding tank.

EXAMPLE 4

The resin composition of Example 3 was mixed at room temperature with the polymer particles of Example 1 by charging to a mixing vessel to give the following final composition:
  15 weight parts polymer particles of Example 1
  40 weight parts of polyester polymer (solids) of Example 3
  45 weight parts by styrene.

The mixture was mildly agitated to form a uniform stabilized resin dispersion. The resulting resin had a viscosity of 1600 centipoises, a weight per gallon of 9.9 and SPI gel time of 9 minutes, an SPI reaction line of 12 minutes, and an SPI peak exothermic of 395° F with 1% BPO at 180° F.

EXAMPLE 5

A bulk molding compound was prepared by mixing together in a Baker-Perkins dough mixer the following materials (parts by weight):

| | |
|---|---|
| CaCO$_3$ | 53.0 |
| Zinc stearate | 1.5 |
| Molding resin composition of Example 4 | 27.0 |
| t-butyl perbenzoate | 0.5 |
| ¼" glass strand | 20.0 |
| Iron oxide pigment 325 mesh | 2.0 |
| Mg(OH)$_2$ | 0.5 |

Three-fourths of the indicated calcium carbonate and zinc stearate were first dry blended in the mixer. The t-butyl perbenzoate catalyst, the pigment, and remaining calcium carbonate were stirred into the liquid molding resin composition and that mixture slowly added to the material in the dough mixer while mixing continued. After thorough wetting of the calcium carbonate had been achieved, the magnesium hydroxide was added and mixing was continued for about two minutes. The chopped glassfiber reinforcement was added and mixing was continued for about 2 minutes until the glass had been thoroughly wetted. The mixing period after addition of the glass was kept as short as possible, consistent with achieving wetting of the glass and uniform dispersion of the glass and thickener, so as not to cause excessive breaking of the glass into shorter strands which would contribute less reinforcement to the molded articles to be produced from the bulk molding compound. The bulk molding compound was finally discharged from the mixer and held overnight (before molding) to insure that the thickening process was substantially complete.

EXAMPLE 6

A piece was molded in the following shape; about nine inches square and ¼ inch thick having on one of its surfaces: (1) a straight rib about ½ inch deep tapering from about 7-5/16 inches long and 9/16 inch wide at the base to about 7-3/16 inches long and ⅜ inch wide at its flat outer extremity, having rounded ends and with its longitudinal centerline about one inch from the edge of the nine-inch square; (2) and L-shaped rib about ½ inch deep with branches about 7-½ inches long and 1-¾ inches wide having centerlines about one inch from the edges of the nine-inch square, the long branch being parallel to the straight rib (1) above and near the opposite edge of the square, the width tapering from about 5/16 inch at the base to about ¼ inch at its flat outer extremity and having rounded ends tapered at about the same angle as the straight rib (1) above; and three circular bosses centered at about 2 inch intervals along a line about 2-½ inches from the edge of the square adjacent to the long branch of the L-shaped rib (2) above and being, respectively, (a) about ½ inch deep and tapering from about one inch in diameter at the base to about 15/16 inch at its flat extremity, (b) about ¼ inch deep and tapering from about one inch in diameter at the base to about 31/32 inch at its flat extremity, and (c) about ¼ inch deep and tapering from about ⅝ inch diameter at the base to about 9/16 inch at its flat extremity, wherein all tapers were approximately flat except for 3 (c) in which the taper was more pronounced near the base and less pronounced near the extremity.

About 350 grams of the bulk molding compound from Example 5 was placed as a compact mass in he steel die which had been preheated to 295° F on the cavity side and 285° F on the plunger side, the die was quickly closed in a press, and held closed for two minutes. The press was then opened and the molded piece removed from the die. An excellent uniformly pigmented part was obtained.

EXAMPLE 7

Sheet molding compound was prepared by first mixing together, by successive additions in the order stated, the following materials (parts by weight):

| Molding resin composition of Example 4 | 100.0 |
|---|---|
| t-butyl perbenzoate | 2.0 |
| Zinc stearate | 3.7 |
| CaCO₃ | 180.0 |
| Mg(OH)₂ | 5.0 |
| 1 inch hard glass strand | 96.9 |
| Carbon black, 400 mesh | 7.5 |

The molding resin composition was introduced to a Cowles hgih speed mixer at about 1000 rpm. The speed was gradually increased with successive additions of CaCO₃, zinc stearate, pigment, and t-butyl perbenzoate, so as to maintain a vortex but without excessive air entrainment, and the magnesium hydroxide thickener was not added until the previously added dry materials were thoroughly wetted and uniformity dispersed at which point the temperature was about 100° F. After addition of the magnesium hydroxide, stirring was continued for about two minutes. This mixture was then discharged and promptly (before excessive thickening, i.e., viscosity increase, had occurred) introduced into a Brenner SMC machine wherein it was spread onto two sheets of polyethylene film to a thickness of about 1/16 inch of each sheet, the one inch glass strands distributed over the exposed surface of one of these sheets and the exposed surfaces of the two sheets then brought together by passing between a pair of rollers. Thorough wetting of the glass was accomplished by then passing the laminated sheet between successive sets of ridged rollers to provide a kneading action. The sheet molding compound so produced was about ⅛ inch thick and was held about 5 days before molding so as to insure substantial completion of the thickening process. An excellent uniformly pigmented sheet was produced.

EXAMPLE 8

Unsaturated thermosetting polyester resins were produced in a conventional manner by esterifying at temperatures up to about 300° F (149° C) glycol components with dicarboxylic components to produce a thermosetting, ethylenicaly unsaturated polyester polymer by condensation reaction and simultaneously removing water. The raw materials of each respective thermosetting, unsaturated polyester polymer are indicated in the following Table 2.

| a) | 4.51 | moles propylene glycol |
|---|---|---|
|  | 1.0 | mole dipropylene glycol |
|  | 5.1 | moles maleic anhydride |
|  |  | Acid No. = 30 |
| b) | 1 | mole propylene glycol |
|  | 8 | moles maleic anhydride |
|  | 2 | moles phthalic anhydride |
|  | 10 | moles propylene oxide |
|  |  | Acid No. = 28 |
| c) | 1 | mole trimethylolpropane |
|  | 8 | moles maleic anhydride |
|  | 1 | mole phthalic anhydride |
|  | 9 | moles propylene oxide |
|  |  | Acid No. = 29 |

EXAMPLE 9

Thermosetting polyesters from Example 8 and lightly cross-linked polymer particles of Table 1 provided a two-component low-shrink molding resin that was combined just prior to making BMC or SMC molding compositions. Excellent pigmentation resulted in the finished molded part.

EXAMPLE 10

Lightly cross-linked polymer particles were produced by conventional latex processing techniques to produce inferior polymer particles which produced poor pigmented, low-shrink molding compositions. Table 3 indicates polymer particles having undesirable particle sizes and/or undesirable cross-linking density. Parts indicated are weight parts, cross-linking density is equivalent cross-linking sites per kilogram of polymer, and average particle size is in microns. Larger particle size polymer particles were made by suspension techniques.

TABLE 3

| | Polymer Composition | Cross-link Density | Average Particle Size (Microns) | Acid No. |
|---|---|---|---|---|
| a) | 99.5 parts styrene<br>0.5 part divinyl benzene | 0.0385 | 0.25 | 0 |
| b) | 96.0 parts styrene<br>4.0 parts divinyl benzene | 0.3077 | 0.25 | 0 |
| c) | 99.5 parts styrene<br>.5 part divinyl benzene | 0.0385 | 0.09 | 0 |
| d) | 96.0 parts styrene<br>4.0 part divinyl benzene | 0.3077 | 0.09 | 0 |
| e) | 98.5 parts styrene<br>1.5 parts divinyl benzene | 0.1154 | 9–11 | 0 |
| f) | 97.5 parts styrene<br>1.0 part acrylic acid<br>1.5 parts divinyl benzene | 0.30 | 0.2 | 0 |
| g) | 40 parts methyl methacrylate<br>60 parts styrene | 0 | 40–50 | 0 |
| h) | 85 parts methyl methacrylate<br>15 parts vinylidene chloride | 0 | 40–60 | 0 |
| i) | 66.0 parts vinyl acetate<br>32.5 parts methyl methacrylate<br>1.5 parts acrylic acid | 0 | 30–50 | 12 |
| j) | 94 parts styrene<br>5 parts cinnamic acid<br>1 part divinyl benzene | .077 | 3 | 19 |
| k) | 96 parts methyl methacrylate<br>4 parts neopentyl glycol diacrylate | 0.22 | 2.7 | 0 |
| l) | 74 parts vinyl acetate<br>26 parts trially isocyanurate | 2.6 | 30–40 | 0 |
| m) | 87 parts vinyl acetate<br>5 parts allyl maleate<br>8 parts trially isocyanurate | 2.1 | 30–50 | 18 |

The foregoing polymer particles produced poor pigmented low-profile parts when compounded, molded, and tested in accordance with the foregoing examples indicating that the preformed polymer particles must be controlled in size as well as cross-link density. Small particle size produced fair low-profile but poor pigmentation such as mottling, streaking and non-uniform color. Non-cross-linked particles similarly produced fair low-profile parts but poor pigmentation. Large polymer particles produced acceptable pigmentation but caused considerable porosity and discontinuity in the molded surfaces.

The following examples illustrate preformed condensation polymer particles in accordance with this invention but are not intended to limit the scope of this invention

EXAMPLE 11

A lightly unsaturated polyester polymer having minor amounts of unsaturation was produced by a conventional polyester fusion cook from the following components:

| | | |
|---|---|---|
| Coconut oil | 0.866 | moles |
| Trimethylol propane | 3.91 | moles |
| Maleic anhydride | 2.45 | moles |
| Phthalic anhydride | 8.15 | moles |
| Propylene glycol | 5.90 | moles |

STEP 1. The foregoing raw materials were charged to a reactor and slowly heated up to about 300° F to esterify dicaboxylic acid components with the polyol components, removing water of reaction, and holding until an acid number of 20 was obtained. The lightly unsaturated polyester polymer was dissolved in monomeric styrene to give a 67% by weight solution of the unsaturated polyester in styrene.

STEP 2. A 3-liter fluted resin kettle fitted with nitrogen inlet, thermometer, paddle stirrer, a condenser, and containing 1000 grams of 0.8% aqueous solution of hydroxyethylcellulose was utilized for suspension polymerization of the polyester-monomer mixture. After bubbling nitrogen through the aqueous solution for 15 minutes, a 200 gram mixture of polyesterstyrene from Step 1 together with 2 grams of lauroyl peroxide and 0.15% of sodium lauroyl sulfate were added to the aqueous solution preheated to about 80° C (176° F) over about 10 minutes with vigorous agitation. After about 30 minutes, the rate of agitation was decreased and after one hour the suspensions was cooled. Thereafter, the suspended lightly cross-linked polyester polymer was dried by centrifuging to remove a major portion of the water. The average particle size of the lightly cross-linked polyester particles was about 80–100 microns and having a cross-linked density of 0.359 equivalent cross-linking sites per kilogram of polymer.

EXAMPLE 12

Several lightly cross-linked polyester polymer particles were prepared in accordance with Example 11 by adding 55 grams of a monomer solution of a polyester polymer containing 40% monomer by weight as indicated in following Table 4. About 5% lauroyl peroxide based on the polymer-monomer solution was added to the polymer-monomer then charged to the resin kettle containing about 650 milliliters of an aqueous solution of 0.8% of hydroxyethylcellulose containing 0.15% of sodium lauroyl sulfate.The addition of the polyesterstyrene mixture was completed in about 10 minutes while continuously heating the solution at 190° F (88° C) under vigorous agitation. The resulting lightly cross-linked polyester polymer particles were filtered and dried having an average particle size of about 70–100 microns and cross-linked density as indicated in the following Table 4. Cross-link density is in cross-linking sites per kilogram of polymer and particle size is in microns.

TABLE 4

| | Moles Reactants | Polymer Particle Characteristics | | |
|---|---|---|---|---|
| | | Cross-link Density | Acid No. | Particle Size |
| a) Coconut oil | 0.866 | | | |
| Trimethylol propane | 3.91 | | | |
| Maleic anhydride | 2.45 | | | |
| Phthalic anhydride | 8.15 | | | |
| Propylene glycol | 5.9 | .3222 | 17.69 | 80–100 |
| Styrene | | | | |
| b) Phthalic anhydride | 6.0 | | | |
| Propylene glycol | 5.6 | | | |
| Glycidylacrylate added to terminal acids | 1.3 | | | |
| Styrene | | 0.1216 | 21.60 | 70–90 |
| c) Adipic acid | 6.0 | | | |
| Propylene glycol | 5.6 | | | |
| Glycidyl acrylate added to terminal acids | 1.3 | | | |
| Methyl methacrylate | | 0.1216 | 18.00 | 44–70 |
| d) Phthalic anhydride | 8.0 | | | |
| Propylene glycol | 1.0 | | | |
| Propylene oxide | 10.0 | | | |
| Maleic anhydride | 2.0 | | | |
| Styrene | | 0.2950 | 12.6 | 20–44 |
| e) Coconut oil | 0.866 | | | |
| Trimethylolpropane | 3.91 | | | |
| Maleic anhydride | 2.45 | | | |
| Tetrachlorophthalic | 4.15 | | | |
| Phthalic anhydride | 4.0 | | | |
| Propylene glycol | 5.9 | 0.2685 | 6.92 | 60–90 |
| Styrene | | | | |

EXAMPLE 13

Several lightly cross-linked polyester polymer particles were produced in the manner indicated in Example 11 but with smaller particle sizes, or lacking cross-linking, or containing excessive cross-linking. The preformed polymer particles produced poorly pigmented and/or poor low-profile molded parts when compounded, molded, and tested in accordance with foregoing examples. Small particle size polymer particles below about 10 microns (average) produced fair low-profile but poor pigmentation such as mottling, streaking, and non-uniform color. Non-cross-linked polymer particles similarly produced poor pigmentation. Large particle size polymer particles above about 150 microns (average) produced discontinuities in the molded surface.

The following examples illustrate a preferred embodiment of this invention wherein the preformed polymer particles further include reactive amino or oxirane groups.

EXAMPLE 14

Into a 3-liter fluted resin kettle fitted with $N_2$ inlet, thermometer, paddle stirrer and condenser was placed 1000 grams of a 0.8% aqueous solution of hydroxyethyl cellulose. After bubbling $N_2$ through the solution for 15 minutes, a solution comprising 10 grams N-t-butyl-aminoethylmethacrylate, 2 grams neopentlyglycol diacrylate, and 188 grams methyl methacrylate plus 2 grams BPO (penzoyl peroxide) was added to the aqueous phase at a bath temperature of about 153° F (67° C) and vigorously agitated. The bath was thereafter heated to about 176° F (80° C). An exotherm occurred after about 20 minutes and was controlled by adding cold water through the condenser. The rate of agitation was thereafter decreased and after about one hour at 80° C the suspension was cooled. The resulting suspended polymer particles were dried by centrifuging to remove a major portion of the water. Methanol was added to the particles which were then filtered and dried in a vacuum over at 60° C. Yield was nearly quantitive. The average particle size was 45–50 microns and the polymer particles has a cross-linking density of 0.0543. The polymer had an amine content of 0.16% by weight of (N).

EXAMPLE 15

Several polymer particles listed in the following Table 5 were produced in accordance with the procedure of Example 14 having an average particle size of about 20 to 100 microns and a cross-link density ranging from 0.05 to 2 equivalent cross-linking sites per kilogram of polymer. The polymer particles were synthesized from monomers indicated on a weight basis and contain reactive amino groups or oxirane groups. Amino groups are in weight percent of (N) and oxirane groups are in weight percent of

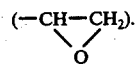

TABLE 5

| | Suspension polymer particles | Cross-link Density* | Amino** | Oxirane*** | Particle Size (microns) |
|---|---|---|---|---|---|
| (a) | 89 parts methyl methacrylate | | | | |
| | 10 parts N,N-dimethylaminoethylacrylate | .0543 | .978 | | 45–55 |
| | 1 part neopentyl glycol diacrylate | | | | |
| (b) | 187 parts methyl methacrylate | | | | |
| | 12 parts 2-aminoethyl | .0271 | .507 | | 35–45 |

TABLE 5-continued

| | Suspension polymer particles | Cross-link Density* | Amino** | Oxirane*** | Particle Size (microns) |
|---|---|---|---|---|---|
| | methacrylate<br>1 part neopentyl glycol diacrylate | | | | |
| (c) | 49 parts methyl methacrylate<br>40 parts styrene<br>10 parts t-butylaminoethyl methacrylate<br>1 part neopentyl glycol diacrylate | .0543 | .82 | | 30–40 |
| (d) | 89 parts vinyl acetate<br>10 parts 2-aminoethylmethacrylate<br>1 part triallyhisocyanurate | 0.0994 | .845 | | 20–30 |
| (e) | 89 parts styrene<br>10 parts N,N-dimethylaminoethyl acrylate<br>1 part divinyl benzene | .0769 | .978 | | 50–60 |
| (f) | 89 parts styrene<br>10 parts m-amino-styrene<br>1 part divinyl benzene | .0769 | 1.176 | | 40–50 |
| (g) | 85 parts styrene<br>14 parts N,N-dimethylaminoethyl acrylate<br>1 part divinyl benzene | .0769 | 1.36 | | 20–30 |
| (h) | 80 parts styrene<br>19 parts N,N-dimethylaminoethyl acrylate<br>1 part divinyl benzene | .0769 | 1.858 | | 20–30 |
| (i) | 80 parts methylmethacrylate<br>19 parts m-aminostyrene<br>1 part neopentyl glycol diacrylate | .0543 | 2.234 | | 20–30 |
| (j) | 45 parts methylmethacrylate<br>40 parts methylacrylate<br>14 parts N,N-dimethyl aminoethyl methacrylate<br>1 part neopentyl glycol diacrylate | 0.543 | 1.24 | | 20–30 |
| (k) | 94 parts methyl methacrylate<br>5 parts t-butylaminoethylmethacrylate<br>1 part neopentyl glycol diacrylate | .0543 | .4100 | | 45–55 |
| (l) | 97 parts methylmethacrylate<br>2 parts t-butylaminoethylmethacrylate<br>1 part neopentyl glycol diacrylate | .0543 | .1640 | | 50–60 |
| (m) | 98.5 parts methylmethacrylate<br>0.5 parts t-butylaminoethylmethacrylate<br>1.0 parts neopentyl glycol diacrylate | .0543 | .0410 | | 55–65 |
| (n) | 95 parts vinyl acetate<br>3 parts allyl amine<br>2 parts triallylisocyanurate | 0.1988 | .7363 | | 20–25 |
| (o) | 89 parts methylmethacrylate<br>10 parts glycidyl acrylate<br>1 part neopentyl glycol diacrylate | .0543 | | 3.36 | 40–50 |
| (p) | 89 parts methylmethacrylate<br>10 parts glycidylmethacrylate<br>1 part neopentyl glycol diacrylate | .543 | | 3.02 | 45–50 |
| (q) | 89 parts styrene<br>10 parts glycidyl acrylate<br>1 part divinyl benzene | .0769 | | 3.36 | 50–60 |
| (r) | 40 parts styrene<br>49 parts methylmethacrylate<br>10 parts glycidyl acrylate<br>1 part neopentyl glycol diacrylate | .0543 | | 3.36 | 45–55 |
| (s) | 49 parts methyl methacrylate<br>40 parts methylacrylate<br>10 parts glycidyl acrylate<br>1 part neopentyl glycol diacrylate | .0543 | | 3.36 | 40–50 |
| (t) | 80 parts methyl methacrylate<br>19 parts glycidyl acrylate<br>1 part neopentyl glycol diacrylate | .0543 | | 6.384 | 30–40 |
| (u) | 70 parts methylmethacrylate<br>29 parts glycidylmethacrylate<br>1 part neopentylglycol diacrylate | .0543 | | 8.758 | 40–50 |

TABLE 5-continued

| | Suspension polymer particles | Cross-link Density* | Amino** | Oxirane*** | Particle Size (microns) |
|---|---|---|---|---|---|
| (v) | 60 parts methylmethacrylate<br>39 parts glycidylmethacrylate<br>1 part neopentylglycol diacrylate | .0543 | | 11.77 | 40-50 |
| (w) | 90 parts vinyl acetate<br>9 parts glycidyl methacrylate<br>1 part triallylisocyanurate | .0994 | | 2.7 | 20-30 |
| (x) | 85 parts vinyl acetate<br>14 parts glycidyl methacrylate<br>1 triallylisocyanurate | .0994 | | 4.22 | 20-30 |
| (y) | 90 parts vinyl acetate<br>9 parts allyl glycidyl ether<br>1 part triallylisocyanurate | .0994 | | 3.393 | 30-40 |

*Cross-linking sites per kilogram of polymer
**Weight % of amino in polymer measured as (N)
***Weight % of oxirane in polymer as measured by $(-CH\underset{O}{\overset{\diagdown\phantom{x}\diagup}{\phantom{x}}}CH_2)$

I claim:

1. A molded part produced from a pigmented low-shrink, thermosetting, unsaturated polyester resin molding composition curable to form a low-profile molded structure having a uniformly pigmented surface, the improvement comprising:
   said molding resin composition being a mixture comprising by weight at least 25% of a thermosetting ethylenically unsaturated polyester polymer, about 5% to 25% of lightly cross-linked preformed polymer particles, and about 30% to 70% of an ethylenically unsaturated monomer copolymerizable with said thermosetting polyester polymer for forming a thermoset matrix binding said preformed polymer particles;
   said lightly cross-linked, preformed polymer particles having an average particle size between about 15 and 100 microns and being a linear polymer selected from the group consisting of copolymerized ethylenic monomers, polyesters, polyurethanes, polyamines, epoxides, alkyd polyesters, polyethers, and polycarbonates, said linear polymer cross-linked with minor amounts of multifunctional monomer providing cross-linking sites in the preformed polymer particles, said preformed polymer particles having a cross-linking density of between about 0.005 to 2 equivalent cross-linking sites per kilogram of said preformed polymer.

2. In a process for producing a uniformly pigmented molded part from a low-shrink moldingg resin composition containing tinting pigments dispersed in a thermosetting unsaturated polyester polymer mixed with copolymerizable ethylenically unsaturated monomer, the improvement comprising:
   forming preformed lightly cross-linked polymer particles having an average particle size between about 15 microns and 100 microns, said cross-linked polymer particles being substantially a linear polymer selected from the group consisting of ethylenic addition polymers, polyesters, polyurethanes, polyamides, polyamines, epoxides, alkyd polyesters, polyethers, and polycarbonates, said linear polymer being cross-linked by minor amounts of multifunctional monomer to provide preformed polymer particles having a cross-linking density of between about 0.005 and 2 equivalent cross-linking sites per kilogram of preformed polymer;
   providing a low-shrink molding resin composition mixture comprising by weight at least about 25% of said thermosetting polyester polymer, about 5% to 25% of said lightly cross-linked preformed polymer particles, and about 30% to 70% of said ethylenically unsaturated copolymerizable monomer;
   and curing the moldingg resin composition to form a molded structure having a uniformly pigmented surface.

3. A pigmentable low-shrink thermosetting unsaturated polyester molding resin composition for thickening with Group II metal oxides, hydroxides, or alkoxides, and curable to form low-profile molded parts, the molding resin composition comprising:
   a resin mixture comprising by weight at least 25% of a thermosetting ethylenically unsaturated polyester polymer, about 5 to 25% of lightly cross-linked preformed polymer particles, and about 30 to 70% of an ethylenically unsaturated monomer copolymerizable with said thermosetting polyester polymer for forming a thermoset matrix binding said preformed polymer particles;
   said lightly cross-linked, preformed polymer particles having an average particle size between about 15 and 100 microns and being a linear polymer selected from the group consisting of ethylenic addition polymers, polyester condensation polymers, polyurethanes, polyamides, polyamines, epoxides, alkyd polyesters, polyethers, and polycarbonates, said linear polymer cross-linked with minor amounts of multifunctional monomer providing cross-linked preformed polymer particles having a cross-linking density of between about 0.005 to 2 equivalent cross-linking sites per kilogram of said preformed polymer whereby said molding resin composition is curable to form a low-profile molded structure.

4. The molding resin composition in claim 3 wherein the lightly cross-linked preformed polymer particles have an average particle size between about 20 microns and 50 microns.

5. The composition in claim 3 wherein said preformed polymer particles are linear ethylenic addition polymers of copolymerized monofunctional ethylenically unsaturated monomer cross-linked by a difunctional ethylenically unsaturated monomer, and said preformed polymer particles have a cross-linking density between about 0.01 and 1.0 equivalent cross-linking sites per kilogram of preformed polymer.

6. The composition set forth in claim 3 wherein the preformed polymer particles are an unsaturated linear polyester polymer cross-linked with vinyl monomer and having a cross-linking density of between about 0.14 and 0.58 equivalent cross-linking sites per kilogram of preformed polymer.

7. The composition in claim 3 wherein the lightly cross-linked preformed polymer particles contain reactive amino groups wherein the preformed polymer particles contain by weight between about 0.02 to 5% amine as measured by (N).

8. The composition in claim 7 wherein the thermosetting polyester is a dicyclopentadiene terminated polyester polymer containing 0.1 moles to 0.4 moles of dicyclopentadiene per mole of dicarboxylic acid and is produced by esterifying dicyclopentadiene with carboxyl groups on a carboxyl terminated polyester prepolymer at temperatures between about 290° F. and 310° F., said dicyclopentadiene terminated polyester polymer mixed with said preformed polymer particles to form a stabilized resin molding composition.

9. The composition in claim 3 wherein the lightly cross-linked preformed polymer particles contain reactive oxirane groups wherein the preformed polymer particles contain by weight between about 0.2 and 15% oxirane as measured

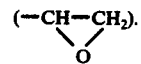

10. The composition in claim 9 wherein the thermosetting polyester is a dicyclopentadiene terminated polyester polymer containing 0.1 moles to 0.4 moles of dicyclopentadiene per mole of dicarboxylic acid and is produced by esterifying dicyclopentadiene with carboxyl groups on a carboxyl terminated polyester prepolymer at temperatures between about 290° F. and 310° F., said dicyclopentadiene terminated polyester mixed with said preformed polymer particles to form a stabilized resin molding composition.

* * * * *